(12) United States Patent
Sangiacomo

(10) Patent No.: US 11,678,770 B2
(45) Date of Patent: Jun. 20, 2023

(54) SHREDDER ADAPTER FOR A MASON JAR

(71) Applicant: Corey Sangiacomo, Ukiah, CA (US)

(72) Inventor: Corey Sangiacomo, Ukiah, CA (US)

( * ) Notice: Subject to any disclaimer, the term of this patent is extended or adjusted under 35 U.S.C. 154(b) by 42 days.

(21) Appl. No.: 17/369,252

(22) Filed: Jul. 7, 2021

(65) Prior Publication Data
US 2021/0330127 A1    Oct. 28, 2021

Related U.S. Application Data

(63) Continuation-in-part of application No. 16/154,435, filed on Oct. 8, 2018, now Pat. No. 11,130,613.

(51) Int. Cl.
*A47J 42/32*    (2006.01)
*B02C 19/00*    (2006.01)
*B02C 18/00*    (2006.01)

(52) U.S. Cl.
CPC ............... *A47J 42/32* (2013.01); *B02C 18/00* (2013.01); *B02C 19/0056* (2013.01)

(58) Field of Classification Search
CPC .... B65D 41/04; B65D 41/06; B65D 21/0228; B65D 21/0209; B65D 1/023; B65D 1/0246; B65D 51/24; B65D 51/18; A47J 42/24; A47J 42/22; A47J 42/20; A47J 42/16; A47J 42/14; A47J 42/06; A47J 42/04; A47J 42/32; A47J 42/34; B02C 18/08; B02C 18/10; B02C 18/11; B02C 19/0056; B65B 3/04

USPC .... 215/200, 44, 43, 329, 228; 220/212, 293, 220/288, 254.8, 259.3, 256.1; 241/169.1; 141/2

See application file for complete search history.

(56) References Cited

U.S. PATENT DOCUMENTS

| | | | |
|---|---|---|---|
| 2018/0312308 A1* | 11/2018 | Hein | B65D 43/0256 |
| 2018/0318840 A1* | 11/2018 | Devegili | A23G 1/12 |
| 2018/0338642 A1* | 11/2018 | Staiano | A47J 42/34 |
| 2018/0346208 A1* | 12/2018 | Painchaud | B65D 47/18 |

* cited by examiner

*Primary Examiner* — Robert J Hicks
(74) *Attorney, Agent, or Firm* — Cynthia S. Lamon; Lamon Patent Services

(57) ABSTRACT

An adapter has a body cylindrical on one end and having a shape of a regular polygon on the opposite end, with an outer diameter, a height, and a central axis, a first counter-bore concentric with the outer diameter on the cylindrical end, the first counter-bore having an internal thread compatible with a thread on a neck of a conventional Mason jar, and ending at a horizontal shoulder, a second counter-bore from the end having the polygonal shape to a depth, ending in a second horizontal shoulder, the second counter-bore having an o-ring groove implemented on an inner diameter of the counter-bore, and a through bore concentric with the central axis passing through the adapter and providing a common inner diameter through the first and the second horizontal shoulders.

8 Claims, 3 Drawing Sheets

SHREDDER ADAPTER FOR A MASON JAR

CROSS-REFERENCE TO RELATED APPLICATIONS

The present application is a continuation-in-part to pending application U.S. Ser. No. 16/154,435 filed Oct. 8, 2018, entitled Jar Adapter, which is incorporated herein by reference in its entirety.

BACKGROUND OF THE INVENTION

1. Field of the Invention

The present invention is in the technical area of cannabis product preparation and storage, and pertains more particularly to an adapter for joining a cannabis leaf shredder to a Mason jar, to shred cannabis leaves into the Mason jar for protection and storage.

2. Description of Related Art

The skilled person will understand that there a many sorts of storage containers that are, and that might be used for storing shredded leaf. Such product is stored in zip-lock bags, on occasion in plain jars, and in many other containers. Many such storage solutions, however, do not keep the product from too much or too little moisture, or from other environmental effects that may be detrimental. The inventors have discovered that well-known Mason jars are ideal for shredded leaf storage, but that there is a problem with shredding the leaf, and transferring same to the Mason jar for storage. Some leaf gets lost in the process, and may get scattered or blown away.

What is clearly needed is a adapter that securely and smoothly joins a shredder to a Mason jar.

BRIEF SUMMARY OF THE INVENTION

In one embodiment of the invention an adapter is provided, comprising a body cylindrical on one end and having a shape of a regular polygon on the opposite end, with an outer diameter, a height, and a central axis, a first counter-bore concentric with the outer diameter on the cylindrical end, the first counter-bore having an internal thread compatible with a thread on a neck of a conventional Mason jar, and ending at a horizontal shoulder, a second counter-bore from the end having the polygonal shape to a depth, ending in a second horizontal shoulder, the second counter-bore having an o-ring groove implemented on an inner diameter of the counter-bore, and a through bore concentric with the central axis passing through the adapter and providing a common inner diameter through the first and the second horizontal shoulders.

In one embodiment the common inner diameter, being the diameter of the through bore, is about 60 mm, which is the inner diameter of an upper rim of a regular-mouth Mason jar, such that, with the adapter threaded to the Mason jar the inner horizontal shoulder contacts the upper rim of the regular-mouth Mason jar, with the through bore of the adapter concentric with the inner diameter of the mason jar. Also in one embodiment the body of the adapter is aluminum, and outer surfaces of the aluminum body are anodized. In one embodiment the body of the adapter is aluminum, and outer surfaces are anodized to individual ones of several different colors. In one embodiment the body of the adapter is molded from a polymer material. And in one embodiment the outer diameter of the circular body is textured to provide a sure gripping surface.

In another aspect of the invention a method is provided for catching and storing shredded leaf, comprising engaging a cylindrical end of a conventional leaf grinder into a counter-bore on one end of an adapter, the counter-bore having an o-ring groove on an inner diameter of the counter-bore with an o-ring in the groove, and a horizontal shoulder at a lower extremity of the counter-bore, such that the cylindrical end of the conventional leaf grinder compresses the o-ring sealing the adapter to the leaf grinder, engaging a threaded end of the adapter to a compatible thread on a neck of a conventional mason jar, and grinding cannabis leaf or bud in the leaf grinder, the ground product passing through a central bore of the adapter into the conventional Mason jar.

In one embodiment the method further comprises disengaging the leaf grinder from the adapter by withdrawing the cylindrical body from the counter-bore, grasping and turning the adapter relative to the Mason jar, disengaging the adapter from the Mason jar, and capping the Mason jar with shredded material inside with a conventional Mason jar lid and seal.

DETAILED DESCRIPTION OF THE INVENTION

Figures 1A, 1B:
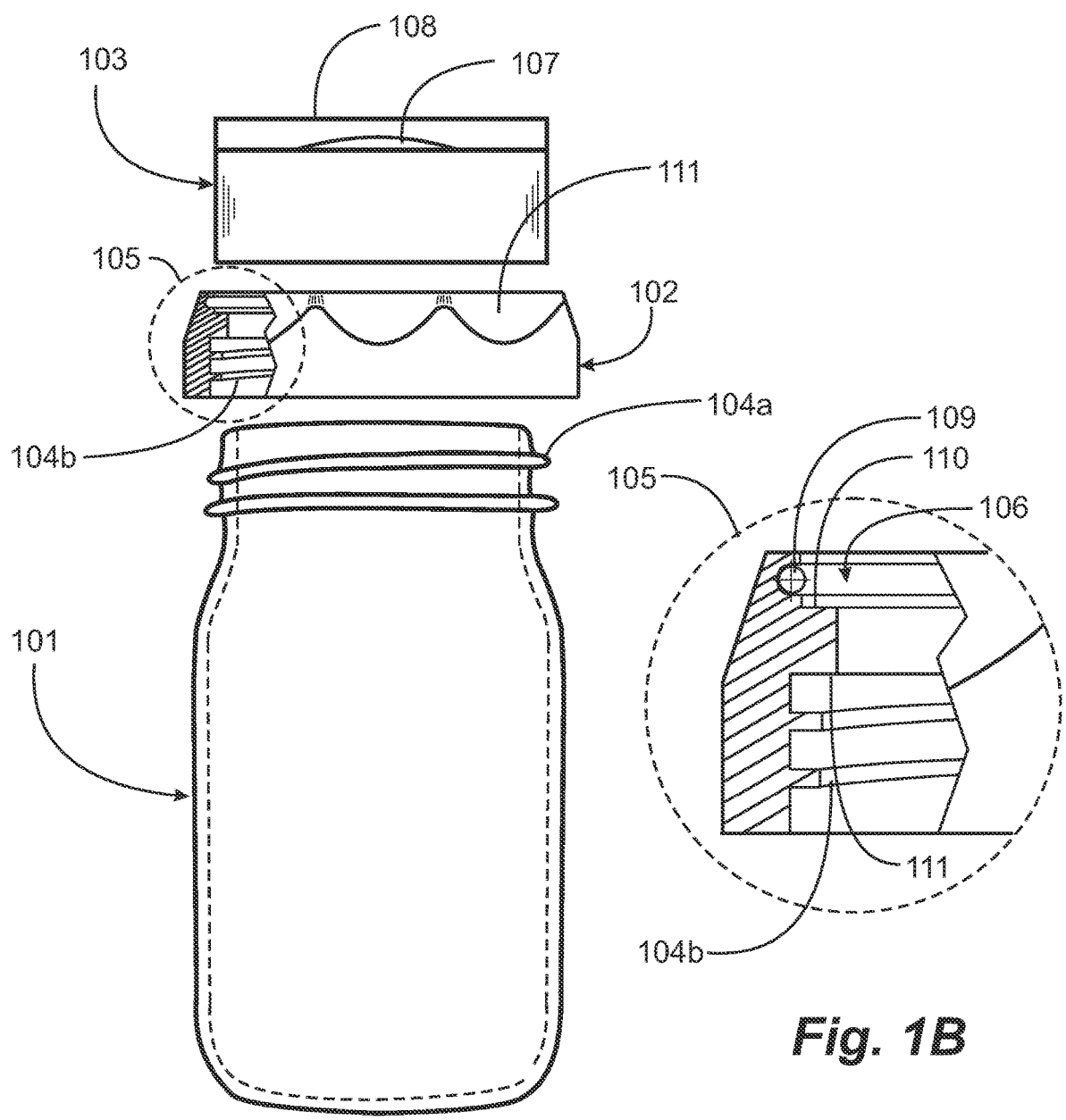
FIG. 1A is an elevation view of a wide-mouth Mason jar, an adapter according to an embodiment of the present invention and a commercially-available leaf shredder, the elements in an exploded view.
FIG. 1B is a partial section view of a portion of the adapter of FIG. 1A.

FIG. 1A is an elevation view of a wide-mouth Mason jar 101, an adapter 102 according to an embodiment of the present invention and a commercially-available leaf shredder 103, the elements in an exploded view. Mason jar 101 has a male threaded neck 104a as is well-known in the art. Adapter 102 is shown having a partial section 105, illustrating a threaded region 104b that engages threads 104a on the mason jar.

FIG. 1B is an enlarged view of region 105 from FIG. 1A, illustrating threads 104b, an o-ring groove 106 implemented in an internal diameter from a side mating with the shredder, and an o-ring 109 which mates with o-ring groove 106, which is specifically sized for the o-ring. It may be seen in FIG. 1A that shredder 103 is in a cylindrical shape having an outside diameter at the end that faces adapter 102. In this example the diameter of the end of the shredder is a slip fit into the inner diameter of the adapter on the end with the o-ring groove and o-ring. There is a horizontal shoulder 110 which serves as a stop for an end of shredder 103 in assembly. There is similarly a horizontal shoulder 111 in the end that engages the threads of the Mason jar, to which the upper lip of the mason jar may contact in assembly.

Figure 2:
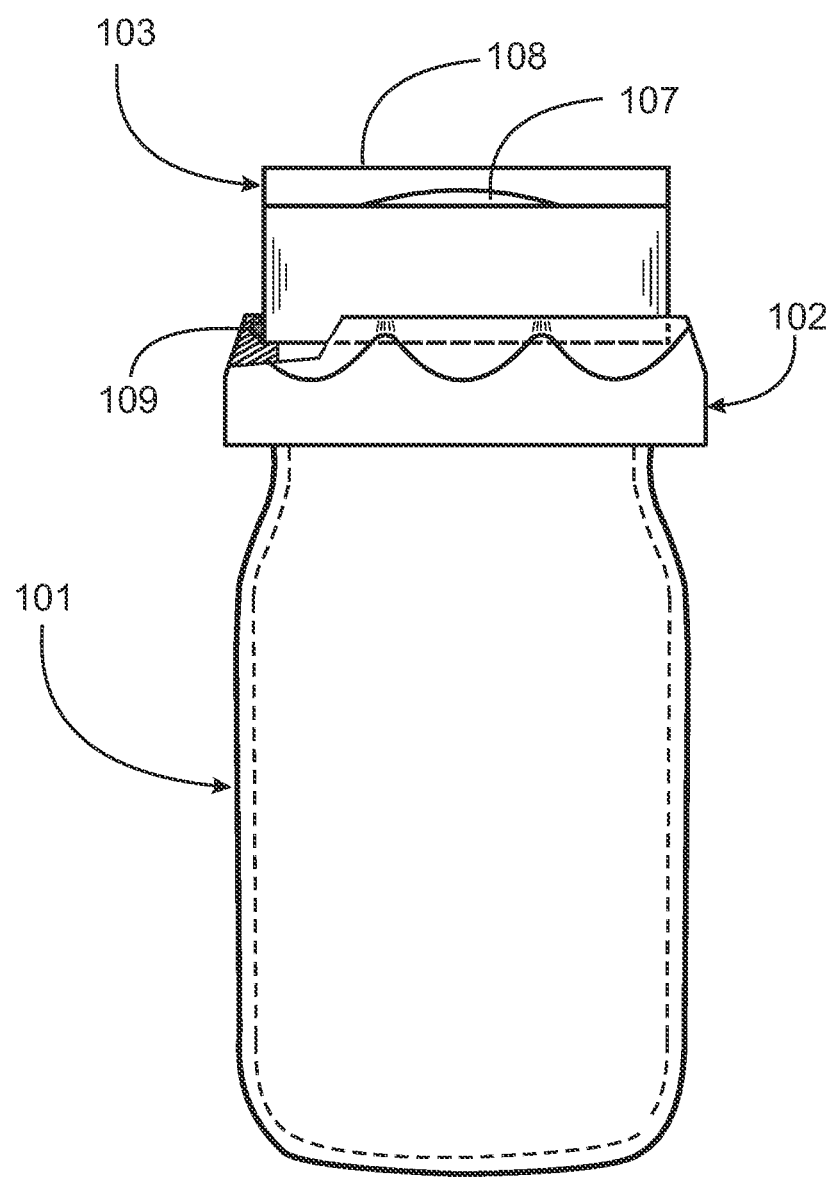
FIG. 2 is an elevation view of the wide-mouth Mason jar, the adapter and the commercially-available leaf shredder of FIG. 1A, shown assembled.

FIG. 2 is an elevation view of the wide-mouth Mason jar 101, the adapter 102 and the commercially-available leaf shredder 103 of FIG. 1A, shown assembled. Adapter 102 is threaded onto threaded neck 104a of Mason jar 101, and shredder 103 has been urged into the inner diameter of the adapter past o-ring 109, such that o-ring 109 seals snugly against the outer body of the shredder. In this assembled relationship, a lid 108 of shredder 103 may be opened by finger slot 107 to place cannabis leaves or buds in the shredder, and the shredder may be operated to shred the leaves or buds, with the shredded result passing through adapter 102 into Mason jar 101. The intimate engagement of the outer diameter of the shredder with the o-ring provides a secure assembly that may yet be dis-assembled by pulling the shredded out of the adapter.

Figure 3A:
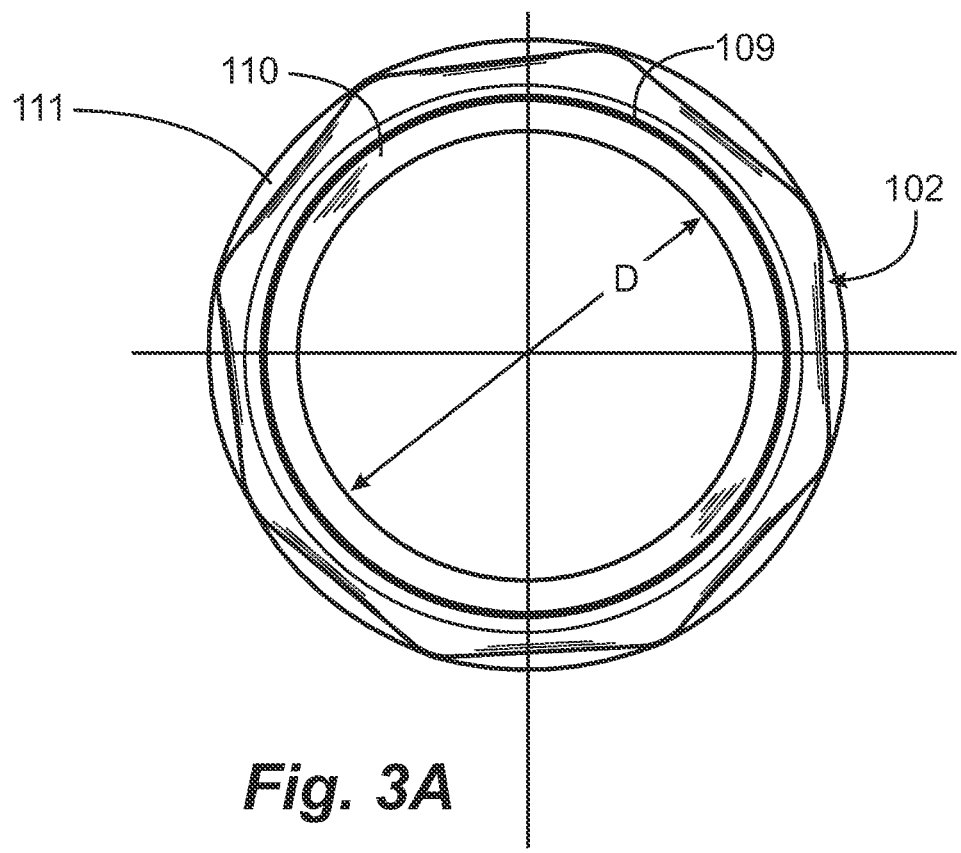
FIG. 3A is a plan view of the adapter of FIGS. 1A and 2, looking from the side mating with the shredder.

FIG. 3A is a plan view of adapter 102 of FIGS. 1A and 2, looking from the side mating with the shredder. It may be seen clearly in this view that the end of the adapter toward the shredder is molded at the end as an octagon, with flat regions 111 from each of the eight sides of the octagon shape blending back into the cylindrical form of the end of the adapter that engages the Mason jar. O-ring 109 may be partially seen in this view and shoulder 110 is clearly evident. The octagonal shape at the shredder end with flats 111 is to provide a sure grip for a user, with the shredder removed, to disengage the adapter from the mason jar.

Figure 3B:
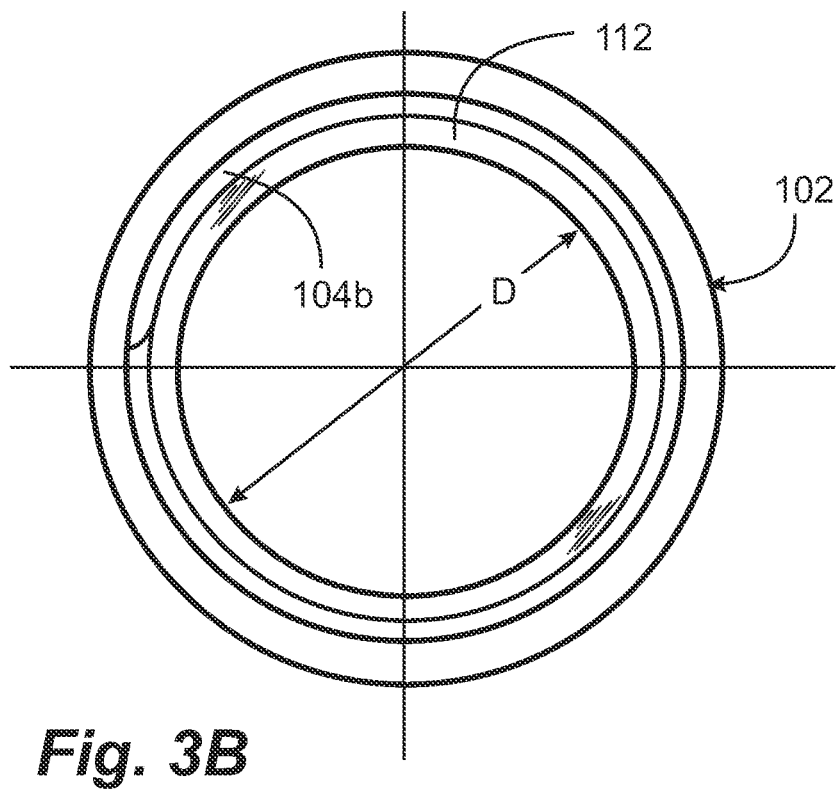
FIG. 3B is a plan view of the adapter FIG. 3A, looking from the side mating with the Mason jar.

FIG. 3B is a plan view of adapter 102 looking from the side that engages the Mason jar. Threads 104b are evident, and shoulder 112 that serves as a stop for the upper lip of the Mason jar in assembly.

Once cannabis has been shredded into Mason jar 101 through adapter 102 from shredder 103, the shredder may be removed by pulling out of the adapter, and the adapter may be gripped by the octagonal shape, and turned to dis-engage from the Mason jar. The well-known thin lid for the Mason jar, having a molded-on rubber gasket, may then the placed on the upper rim of the Mason jar, and the well-known threaded closure may be mounted to compress and hold the thin upper lid. In some embodiments the threaded closure and the thin upper lid are a single entity. The present inventor considers the quality of hermetic sealing provided by Mason jars and their conventional closures to be advantageous for keeping shredded leaf fresh and flavorful.

Adapters such as 102 shown may be molded in many embodiments from suitable polymer materials, and in other embodiments may be manufactured of aluminum and black anodized. Other colors such as gold and blue may be provided in anodized aluminum. Other metals may be used, such as titanium for example. There may be different textures applied to the outer surface of adapters as aid for a user's grip, or in some cases just for aesthetic effect. In some cases a user may elect to use a rubber-like seal between the mason jar and the adapter. There are many possibilities.

The skilled person will understand that the embodiments taught in enabling detail herein are, in fact, exemplary, and there may well be other variations, not discussed in detail, that will still lie within the scope of the invention. An adapter of the sort taught herein may have different threads at the upper extremity to accommodate shredders of different make and model. The invention is limited only by the scope of the claims below.

I claim:

1. An adapter, comprising:
   a body cylindrical on one end and having a shape of a regular polygon on the opposite end, with an outer diameter, a height, and a central axis;
   a first counter-bore concentric with the outer diameter on the cylindrical end, the first counter-bore having an internal thread compatible with a thread on a neck of a conventional Mason jar, and ending at a horizontal shoulder;
   a second counter-bore from the end having the polygonal shape to a depth, ending in a second horizontal shoulder, the second counter-bore having an o-ring groove housing an o-ring implemented on an inner diameter of the counter-bore enabled to engage a female thread of a commercially-available herb grinder; and
   a through bore concentric with the central axis passing through the adapter and providing a common inner diameter through the first and the second horizontal shoulders;
   wherein the adapter only makes contact with the commercially available herb grinder at the o-ring at an upper edge of the adapter and only makes contact with the Mason jar at the course female thread.

2. The adapter of claim 1 wherein the common inner diameter, being the diameter of the through bore, is about 60 mm, which is the inner diameter of an upper rim of a regular-mouth Mason jar, such that, with the adapter threaded to the Mason jar the inner horizontal shoulder contacts the upper rim of the regular-mouth Mason jar, with the through bore of the adapter concentric with the inner diameter of the mason jar.

3. The adapter of claim 1 wherein the body of the adapter is aluminum, and outer surfaces of the aluminum body are anodized.

4. The adapter of claim 3 wherein the body of the adapter is aluminum, and outer surfaces are anodized to individual ones of several different colors.

5. The adapter of claim 1 wherein the body of the adapter is molded from a polymer material.

6. The adapter of claim I wherein the outer diameter of the circular body is textured to provide a sure gripping surface.

7. A method for catching and storing shredded leaf from a commercially-available herb grinder into a Mason jar, comprising:
   engaging a cylindrical end of a commercially-available herb grinder into a counter-bore on one end of cylindrical adapter, the counter-bore having an o-ring groove on an inner diameter of the counter-bore with an o-ring positioned in the groove, and a horizontal shoulder at a lower extremity of the counter-bore, such that the cylindrical end of the commercially-available herb grinder only makes contact with the o-ring of the adapter and the horizontal shoulder and compresses the o-ring sealing the adapter to the commercially-available herb grinder;
   engaging a threaded end of the adapter to only a compatible thread on a neck of a conventional Mason jar; and
   grinding herb material in the commercially-available herb grinder, the ground herb passing through a central bore of the adapter into the conventional Mason jar.

8. The method of claim 7 further comprising:
disengaging the commercially available herb grinder from the adapter by withdrawing the cylindrical body from the counter-bore;
grasping and turning the adapter relative to the Mason jar, disengaging the adapter from the Mason jar; and
capping the Mason jar with shredded material inside with a conventional Mason jar lid and seal.

* * * * *